No. 831,577. PATENTED SEPT. 25, 1906.
J. R. THOMAS.
FEEDING DEVICE FOR WOODWORKING MACHINERY.
APPLICATION FILED DEC. 15, 1903.

Witnesses.
Henry N. Bauer
Herbert F. Harden

Inventor.
John R. Thomas,
by his Attorney.

No. 831,577.

PATENTED SEPT. 25, 1906.

J. R. THOMAS.
FEEDING DEVICE FOR WOODWORKING MACHINERY.
APPLICATION FILED DEC. 15, 1903.

No. 831,577. PATENTED SEPT. 25, 1906.
J. R. THOMAS.
FEEDING DEVICE FOR WOODWORKING MACHINERY.
APPLICATION FILED DEC. 15, 1903.

Witnesses.
Henry N. Bauer.
Herbert F. Harden.

Inventor.
John R. Thomas,
by F. F. Hubsleb, His Attorney.

UNITED STATES PATENT OFFICE.

JOHN R. THOMAS, OF CINCINNATI, OHIO, ASSIGNOR TO J. A. FAY & EGAN COMPANY, OF CINCINNATI, OHIO, A CORPORATION OF WEST VIRGINIA.

FEEDING DEVICE FOR WOODWORKING MACHINERY.

No. 831,577.　Specification of Letters Patent.　Patented Sept. 25, 1906.

Application filed December 15, 1903. Serial No. 185,250.

*To all whom it may concern:*

Be it known that I, JOHN R. THOMAS, a citizen of the United States, residing at Cincinnati, in the county of Hamilton and State of Ohio, have invented certain new and useful Improvements in Feeding Devices for Woodworking Machinery, of which the following is a specification.

My invention relates to feeding devices for woodworking machinery, especially planing machinery, and has for its object the providing of compact, simple, and powerful feeding agency; and for accomplishing my object I provide a supplemental frame connected with the main frame of the machine by means of long ways, the supplemental frame having swinging roll-housings mounted thereon supporting the upper feeding-rolls, the housings swinging about a shaft secured in stationary position with relation to the supplemental frame, the rolls on the housings being driven by means of expansion-gearing from a shaft stationarily positioned with relation to the main frame, the latter shaft and the shaft stationarily positioned in the supplemental frame having thereby relative movement between them and also having between them a link-expansion-gear drive and pivoted roll-housing, said link-expansion drive and pivoted roll-housing collectively having a plurality of intermediate articulations in different planes.

My invention therefore consists in providing a supplemental frame which may have upright standards of substantially the height of the main frame inside the main frame and connected thereto by long ways, with upper roll-housings swinging on said supplemental frame; in providing novel means for hanging the roll-housings and driving the rolls thereon, comprising a shaft about which the roll-housings are pivoted, stationarily positioned with relation to the supplemental frame, a shaft stationarily positioned with relation to the main frame, said first-named shaft being adjustable with relation to said second-named shaft, and link expansion-gearing connecting one of the roll-housings with said second-named shaft, affording a plurality of intermediate articulations in different planes between said named relatively adjustable shafts—*i. e.*, between the axis of swing of the roll housing or housings, which is adjustable with the supplemental frame, and the axis of the driving-shaft for the expansion-gearing on the main frame; further, in providing novel means, hereinafter described and claimed, for giving pressure to said roll-housings and moving with said supplemental frame; further, in providing a longitudinally-movable shaft for the feed-roll, whereby the feed-roll itself may be removed and exchanged without disturbing the position of the gears, and, further, in the parts and in the construction, arrangement, and combinations of parts hereinafter more fully described and claimed.

A represents the main frame, on which a supplemental frame B is adjustable in manner hereinafter explained, the supplemental frame having upper roll-housings C C' swinging thereon, said upper roll-housings supporting upper feed-rolls D D'.

E is a stock-supporting table or bed for the machine, and F F' are the lower feed-rolls. Suitable cutter-heads for planing one or more sides of the stock are also provided, but are not shown because well known.

The supplemental frame or slide comprises side standards 11 12 and a cross-girth 13, each of the standards being provided with long tongues 14 15, sliding in ways on the sides of the frame, gibs 18 19 taking from said sides over the tongues and forming the ways and confining the standards between the sides of the main frame and the gibs. The standards of the supplemental frame extend, preferably, substantially throughout the height of the main frame when the supplemental frame is in lowered position. The supplemental frame is adjusted up and down with relation to the main frame by means of threaded rods 20 21 at the respective sides of the machine, engaging internally-threaded lugs 22 23 on the main frame, the threaded rods being held against endwise movement with relation to the supplemental frame by means of collars 24 25 on the respective rods engaging shoulders on the supplemental frame. For convenience and strength swellings 26 27 on the supplemental frame encompass the rods at their upper ends. The respective rods carry bevel-gears 28 29, meshing with bevel-pinions 30 31 on a cross-shaft 32, journaled in the supplemental frame and operated by means of a hand-wheel 33. The supplemental frame carries a cross-shaft 35, preferably stationary, about which the upper roll-housings C C' swing. This cross-shaft is preferably located in substantially the transverse middle of the sides of the supplemental frame. The housing C carries the upper feed-roll D, mounted on shaft 37, and the housing C' carries the upper feed-roll D', mounted on shaft 39. The housings normally rest on lugs 36 38 on the supplemental frame.

Figure 1:
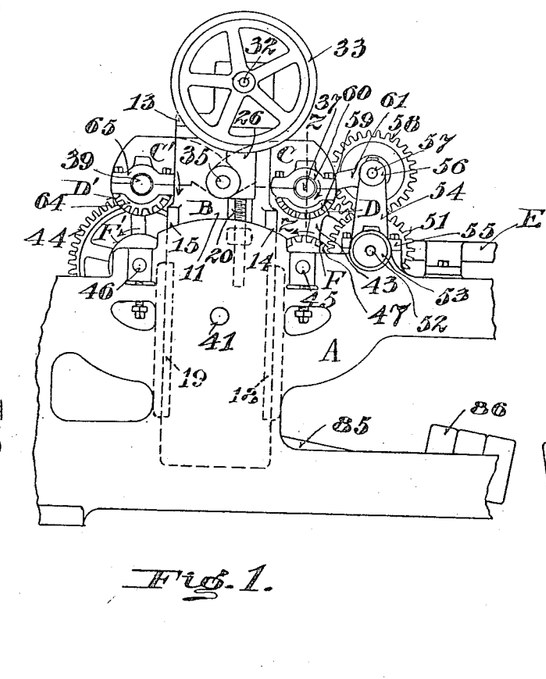
Figure 1 represents a left-side elevation of my improved device.
Figure 2:
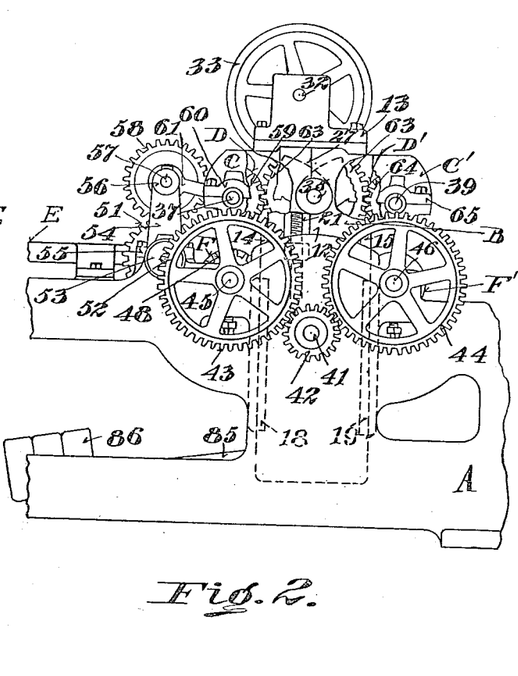
Fig. 2 is a right-side elevation of the same, partly broken away.

A driving-shaft 41 receives motion from any suitable source of power and has thereon a pinion 42, meshing with gears 43 44, respectively, on shafts 45 46 of the respective lower feed-rolls F F'. The shaft 45 also has gears 47 48 secured thereto, one at each end of the roll. The gears 47 48, respectively, mesh with gears 51, secured to a shaft 52. Shaft 52 is preferably journaled at each end in a hub 53 of an expansion-link 54, the said hub being journaled in a bearing 55 on the frame. At the end of each of these expansion-links there is a bearing 56 for a cross-shaft 57, at each end of which a gear 58 is secured, the gears 58 being meshed by the gears 51. Each gear 58 meshes with a gear 59 for driving the shaft 37. The shaft 37 rotates within the bearings 60 on the housing C. Expansion-links 61 take about the bearings 56 on the expansion-links 54 and about the axis of the shaft 37. Each gear 59 meshes with a gear 63 on the shaft 35, each gear 63 meshing with and driving a gear 64 on the shaft 39 of feed-roll D', rotating within the bearings 65 on housing C'. The rolls are driven in the direction indicated by the arrows in Fig. 1, the feeding-in side of the upper feed-rolls being driven down. The expansion-links are projected from in front of and toward the front or feed-in side of the roll mounted in the housing with which the expansion-link mechanism connects, and the pivot of said housing is at the rear or feed-out side of said roll. The upper feed-rolls are also given a parallel lift and drive.

My improved construction reduces the strain upon the supplemental frame occasioned by the drive and yield of the rolls to the minimum and directs this strain along lines which will minimize binding of the parts. I further mount the driving means and means for yielding to inequalities of the stock on pivotal bearings coöperating for driving the in-feeding face of the upper feed-rolls downward toward the stock for obtaining maximum feeding force with minimum power application. It will be noted that the upper feed-roll housings are mounted pivotally upon a shaft located at substantially the transverse middle of the sides of the supplemental frame or slide. The link expansion-gearing exerts its downward pressure at the forward or swinging end of the forward housing from in front of the housing. When pressure is exerted for causing the forward upper feeding-roll to yield to stock, the housing of said forward upper feed-roll swings on its pivot at its rear against the force of the power exerted by the drive from in front of the housing and the force of the pressure device, thereby causing the resistance to this yield at the pivot to be exerted in a direction substantially longitudinal of the sides of the supplemental frame, and thereby reducing the wedging effect between the sides of the supplemental frame and their guideways to the minimum and permitting adjustment of said supplemental frame to height even during operation of the machine. A similar effect is produced when the rear one of the upper feed-rolls is caused to yield to stock, and the sides for the supplemental frame are extended substantially above and below the table of the machine for further aiding in easy manipulation and in causing the yield to be in true lines, so that the upper feed-rolls may at all times be in correct positions above the lower feed-rolls for obtaining maximum feeding power.

Figure 3:
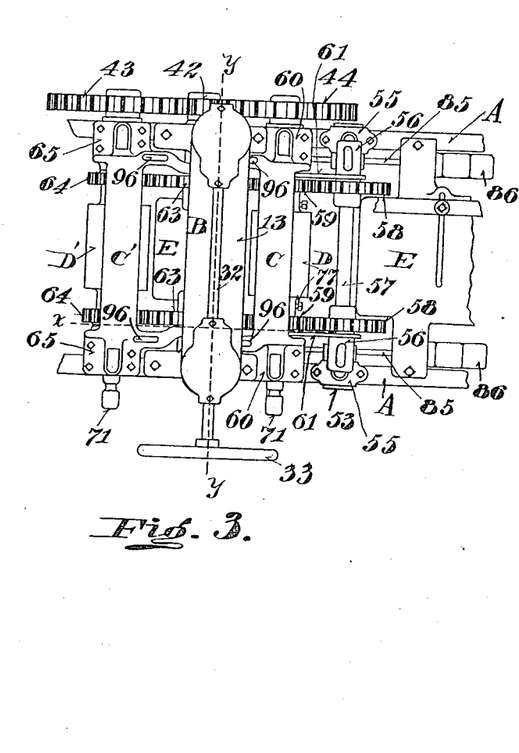
Fig. 3 is a plan view of the same.
Figure 4:
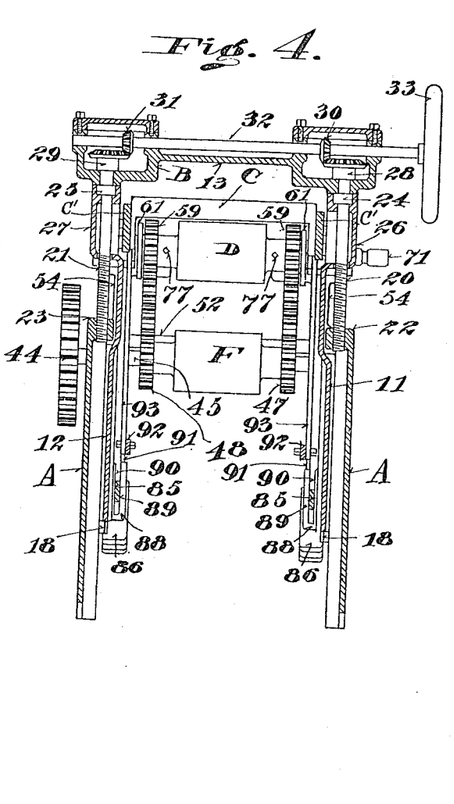
Fig. 4 is a cross-section of the same on the line *y y* of Fig. 3.
Figure 5:
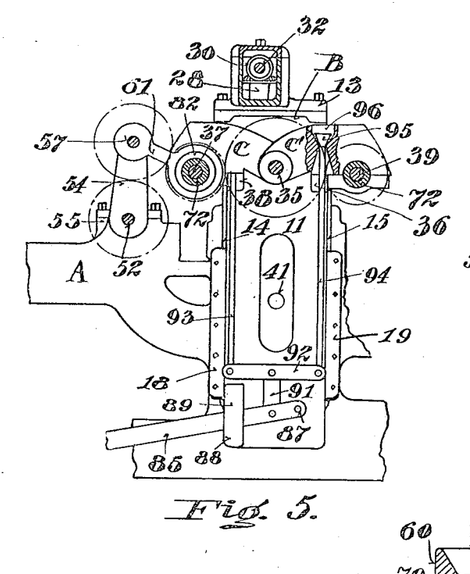
Fig. 5 is a longitudinal section of one side of my improved device, taken on the line *x* of Fig. 3, with the pitch-line of the gearing operating the upper feed-rolls from the main frame, indicated in dotted lines, and with the supplemental frame in lowered position.
Figures 6, 8:
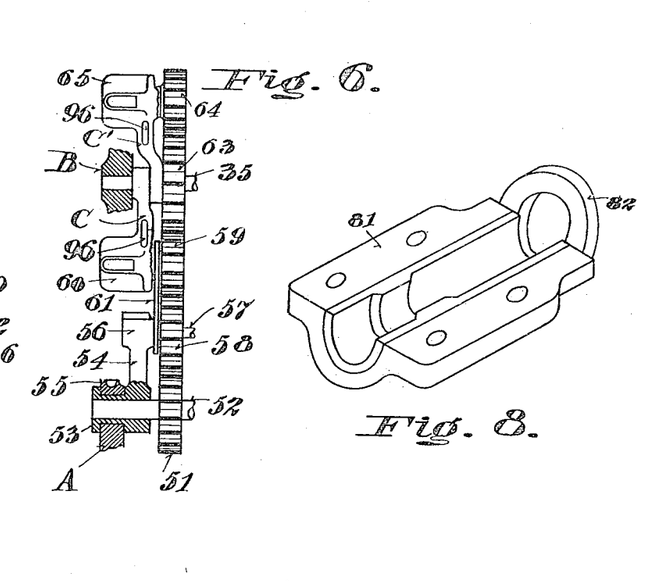
Fig. 6 is a diagram view of the gearing and pivotal connections for the upper feeding-roll housings, partly shown in section.
Fig. 8 is a perspective view of the bearing-cap having the link supporting-ring thereon.
Figure 7:
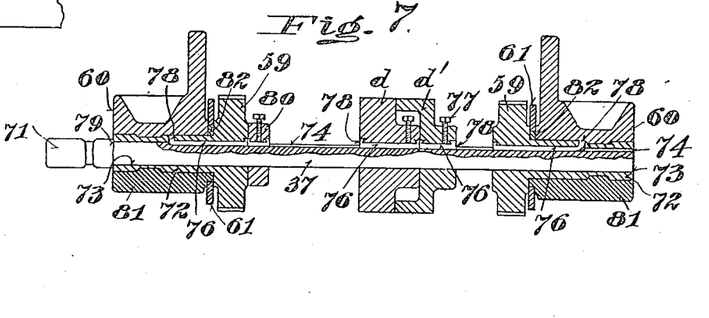
Fig. 7 is a longitudinal section taken on the line *z z* of Fig. 1, showing the feed-roll sections with the longitudinally-movable shaft and its driving connection.

I have shown the upper roll-housings as provided with novel means for substituting feed-roll sections for the feed-rolls and for removing and exchanging the feed-rolls and feed-roll sections. Referring to Figs. 7 and 8, I have shown the shaft 37 as a pull-out shaft having a handle 71. I have also shown the gears 59 provided with hubs 72, journaled in the bearings 60, the said gears also having internal bore 73, into which the shaft 37 projects. The shaft is provided with a spline 74, the feed-roll sections d d' each also having a spline with a feather 76 taking into the splines for securing the feed-roll sections and shaft together. Each of the feed-rolls and feed-roll sections it is desired to place upon the shaft is provided with a similar spline 75. Bolts 77, taking against the feathers, secure the roll or roll-sections securely in place. The feathers are preferably made in sections, each gear 58 and each roll and roll-section being provided with a feather for taking into the splines. These feather-sections have lugs 78, which take into indentations in the respective rolls, roll-sections, and gears 59 for preventing accidental dropping out of the feathers when the roll or roll-sections are removed, but have sufficient looseness in fit to permit clamping on the shaft by means of the bolts 77. The feathers may be firmly secured to the gears, if desired. This construction permits the shaft to be pulled or drawn out or moved longitudinally for removing or exchanging the feed-roll or feed-roll sections without disturbing the gearing. This construction is especially useful in that class of planers known as "inside molding machines," where narrow stock is frequently planed and it is desirable to use different kinds of feed-rolls or different widths of feed-rolls, depending on the character or width of stock it is desired to feed through the machine. Thus in Figs. 3 and 4 I have shown wide feed-rollers D. D' mounted in the machine, the rollers being substantially the width of the capacity of the machine. In Fig. 7 I have shown this feed-roll substituted by the narrow feed-roll sections d d', various numbers of which may be employed at different points in the width of the machine along the shaft, the sections being either fluted, toothed, ribbed, or smooth or of such contour as may be desired for the character of work being done. The shaft is held in position longitudinally by a shoulder 79 on the hub shaft which takes against the end of the hub of gear 58 and a collar 80, which is secured to the shaft at the inner end of gear 58. If desired, also, fluted, ribbed, or smooth rolls of full width of the capacity of the machine may be mounted on the shaft. In the present exemplification of my invention each of the shafts 37 and 39, with their feed-rolls and gears, are constructed and provided with connections for permitting the shaft to be pulled out or withdrawn from the roll or roll-sections. It is necessary to move the shaft longitudinally only far enough to permit the roll or roll-sections to be removed radially.

My improved construction permits longitudinal movement of the roll-shaft and radial—i. e., sidewise—removal of the roll and roll-section without disturbance of the link expansion or gearing driving the roll. The caps 81 of bearings for the housing C are preferably provided with a ring 82, taking about the hubs 72 for affording a pivot for the expansion-link 61, thereby removing the link from direct journal contact with the gear.

Each of the roll-housings is provided with pressure mechanism moving with the supplemental frame for affording pressure on the stock. Preferably at each side of the supplemental frame a weight-lever 85, carrying weights 86, is pivoted on a bolt 87. The lever normally rests on a lug 88, having an upward extension 89, forming a slot 90 between the standards and lug in which the lever is movable. The lever is articulated with a link 91, in turn articulated with a cross-link 92, at the respective ends of which connecting rods or cables 93 94 are articulated, the upper ends of said rods or cables respectively connecting with the housings C C'. The upper ends of these rods are preferably enlarged, as shown at 95, and rest in sockets 96, the flaring walls of which retain the enlargement, the lower ends of the sockets being also flared for clearance of the rods when the housings swing on their pivots.

Having thus fully described my invention, what I claim as new, and desire to secure by Letters Patent, is—

1. In feeding mechanism for a planer, the combination of a frame, a slide thereon, having sides rigid therewith extending above and below the table and a hinged housing on slide supporting upper feeding-roll, said housing pivoted at its rear, and link expansion-gearing connecting with said roll from in front.

2. In feeding mechanism for a planer, the combination of a frame, a slide thereon, having sides rigid therewith extending above and below the table a hinged housing on slide supporting upper feeding-roll, said housing pivoted at its rear, link expansion-gearing connecting with said roll and projected from in front of and toward the front or feed-in side of said roll and pressure device for the housing movable with slide.

3. In feeding mechanism for a planer, the combination of a frame, a slide thereon, a hinged housing on slide supporting feeding-roll, gearing journaled on the housing, and a shaft movable longitudinally in and an expansion-link pivoted about said journaled gearing permitting removal of feeding-roll without dismantling said gearing or link.

4. In feeding mechanism for a planer lower feed-rolls, a self-contained rigid sliding support extending above and below the lower feed-rolls and carrying hinged housings for upper feeding-rolls, in combination with said housings and linked expansion-gearing connecting the frame and the swinging end of one of said hinged housings and projected toward said swinging end from in front of and toward the front or feed-in side of the feeding-roll in said end.

5. In a feeding device for woodworking machinery, the combination of a main frame, a supplemental frame adjustable thereon, a supplemental-roll housing pivoted at its rear on the supplemental frame, linked expansion-gearing pivoted on the main frame and projected from in front of and toward and connecting the swinging end of said housing with the main frame and a feed-roll journaled in the housing and located in vertical plane between said pivots, said housing and linked expansion-gearing having their only common articulation at the swinging end of said housing, substantially as described.

6. In a machine of the character described, the combination of a main frame, lower feeding-roll, a supplemental frame having rigid sides extending below said lower feeding-roll and adjustable on the main frame, a swinging upper feed-roll housing having its pivot at its rear on the supplemental frame, an upper feed-roll in the swinging end of said housing, swinging link expansion-gearing projected from in front of and toward and having connection with and driving said upper feed-roll and having its pivot on the main frame, said housing and link expansion-gearing having a single common swinging articulating axis which is located at the swinging end of said housing.

7. In a machine of the character described, the combination of a main frame, lower feeding-roll, a supplemental frame having rigid sides extending below said lower feeding-roll and adjustable on the main frame, a swinging upper feed-roll housing having its pivot at its rear on the supplemental frame, an upper feed-roll in the swinging end of said housing, a pressure device below said lower feeding-roll and having connection with said upper feed-roll housing, said pressure device mounted on the lower end of and movable with said supplemental frame, swinging link expansion-gearing projected from in front of and toward the front or feed-in side of the roll and having connection with and driving said upper feed-roll and having its pivot on the main frame, said upper feed-roll located in vertical plane between said named pivots, said housing and link expansion-gearing also having a single common swinging articulating axis which is located at the swinging end of said housing.

8. In a feeding device for woodworking machinery, the combination of a main frame, a supplemental frame adjustable thereon, a shaft in the main frame, a shaft mounted in and movable with the supplemental frame into different horizontal planes, a feed-roll housing and link expansion-gearing having a plurality of intermediate articulations in different planes pivoted about said shafts for driving the feed-roll from the first-named shaft, said housing and link-expansion gearing having their only common articulation at the swinging end of said housing, with the feed-roll in said housing located in vertical plane between said pivots, the pivot of said housing being at the rear of said housing and said link expansion-gearing projected toward said housing from in front thereof.

9. In a feeding device for woodworking machinery, the combination of a main frame, gearing thereon, a supplemental frame adjustable on the main frame, a shaft in said supplemental frame, a pair of roll-housings pivoted about said shaft in substantially the transverse middle of the sides of said supplemental frame, a feed-roll journaled in the swinging end of each housing, a gear for each roll and connected by a meshing gear, and expansion-gearing connecting the gear in the swinging end of one of said housings with the gearing on the main frame, and projected toward said housing from in front thereof, said housing and link expansion-gearing having a single common swinging articulating axis which is located at the swinging end of said housing, substantially as described.

10. In a feeding device for woodworking machinery, the combination of a main frame, a supplemental frame adjustable thereon, a shaft carried by and adjustable with the supplemental frame, a shaft stationarily positioned with relation to the main frame, gearing therefor, a feed-roll housing swinging at its rear about said shaft on the supplemental frame, a feed-roll shaft journaled in the swinging end of said housing, a gear for said shaft, and expansion-gearing projected from in front toward and connecting said last-named gear in the swinging end of the housing with gearing on said main-frame shaft, said housing and expansion-gearing having their only common articulation at the swinging end of said housing, substantially as described.

11. In feeding mechanism for woodworking machinery, the combination of a swinging feed-roll housing whose pivot is at its rear end vertically adjustable and rigidly positioned after adjustment, a feed-roll in its swinging end, link expansion-gearing projected from in front of and toward the front or feed-in side of the roll mounted in said housing and connecting with the swinging end of said housing and having pivot from which it swings, said roll swinging in an arc projected between said pivots, and said housing and link expansion-gearing having their only common articulation at the swinging end of said housing.

12. In a feeding device for woodworking machinery, the combination with the main frame, gearing thereon, lower feed-rolls in the main frame, a supplemental frame extending substantially below said lower feed-rolls and adjustable on the main frame, a pair of upper feed-roll housings pivoted on the supplemental frame at substantially the transverse middle of the sides of the latter, an upper feed-roll in each housing, gearing at each end of each of said upper feed-rolls, gearing at each side of the supplemental frame operatively connecting the gearing at the respective ends of the housing-rolls and movable with the supplemental frame, and link expansion-gearing at each side of the swinging end of the forward one of said housings projected from in front of and toward the feed-in side of the roll therein and connecting the gearing therein with the gearing on the main frame, whereby said housings are given parallel lift and drive, said last-named housing and said link expansion-gearing having their only articulation at the swinging end of said housing, and a pressure device for the rolls mounted at the lower ends of said supplemental frame and movable therewith, and connections therefrom to said housings, said construction forming self-contained upper-feed-roll-supporting supplemental frame and pressure device extending substantially below the lower feed-rolls, substantially as described.

13. In a feeding device for woodworking machinery, the combination with the main frame, gearing thereon, lower feed-rolls in the main frame, a supplemental frame extending substantially below said lower feed-rolls and adjustable on the main frame, a pair of upper-feed-roll housings pivoted on the supplemental frame at substantially the transverse middle of the sides of the latter, an upper feed-roll in each housing, gearing at each end of each of said upper feed-rolls, gearing at each side of the supplemental frame operatively connecting the gearing at the respective ends of the housing-rolls and movable with the supplemental frame, and link expansion-gearing at each side of the swinging end of the forward one of said housings projected from in front of and toward the front or feed-in side of the feed-roll therein and connecting the gearing thereon with the gearing on the main frame of said feed-rolls downward, whereby said housings are given parallel lift and drive, said last-named housing and said link-expansion gearing having their only articulation at the swinging end of said housing, a weight-lever pivoted to the lower end of said supplemental frame below the lower feed-rolls and movable with the supplemental frame, and link connection therefrom to said roll-housings, said construction forming self-contained upper feed-roll-supporting supplemental frame and pressure device extending substantially below the lower feed-rolls, substantially as described.

14. In a feeding device for woodworking machinery, the combination of a main frame, gearing thereon, a supplemental frame adjustable on the main frame, a shaft in the supplemental frame at substantially the transverse middle of the sides of the latter, a pair of feed-roll housings pivoted about said shaft, a feed-roll journaled in each housing, a gear for each roll, a gear meshing with each of the latter, and link expansion-gearing connecting the swinging end of the first of said housings and the gear thereon with the gearing on the main frame, said housing and link expansion-gearing having their only common articulation at the swinging end of said housing, said link expansion-gearing connecting with said last-named housing from the feeding-in side thereof and said housing being pivoted in rear of the roll therein, and constructed and arranged for driving the feeding-in side of each of said rolls downwardly, substantially as described.

15. In a feeding device for woodworking machinery, the combination of a main frame, gearing thereon, lower feed-rolls positioned in the main frame, a supplemental frame comprising a pair of side standards rigid with said supplement frame extending substantially below said positioned lower feed-rolls when said supplemental frame is in normal lowered position, with long ways between the supplemental frame and main frame inside the main frame and extending below said lower feed-rolls, a pair of upper feed-roll housings pivoted on the supplemental frame at substantially the transverse middle of said side standards, and link expansion-gearing connecting the swinging end of the forward one of said housings from in advance of said housing with the gearing on the main frame, substantially as described.

16. In a feeding device for woodworking machinery, the combination of a main frame, gearing thereon, lower feed-rolls rigidly positioned in the main frame, and self-contained upper feed-roll-supporting supplemental frame and pressure device extending substantially below said lower feed-rolls, said supplemental frame having a pair of side supplemental frame rigid therewith extending substantially below said rigidly-positioned lower feed-rolls when said supplemental frame is in normal lowered position, with long ways between the supplemental frame and main frame inside the main frame and extending below said lower feed-rolls, a pair of upper feed-roll housings pivoted on the supplemental frame at substantially the transverse middle of said side standards, and link expansion-gearing connecting the swinging end of the forward one of said housings from in advance of said housing with the gearing on the main frame, said pressure device pivoted at the lower end of a standard below said lower feed-rolls and movable with said standard, and connections therefrom to said housings, substantially as described.

17. In a feeding device for woodworking machinery, the combination with the main frame, of a supplemental frame adjustable thereon, hinged upper feed-roll housings carried by the supplemental frame, feed-rolls therein, and linked expansion-gearing connecting the main frame and the forward one of said hinged housings, forming driving connection for the roll therein, said last-named housing being pivoted at its rear and said driving connection comprising at least two pivotally-hung gears linked together and communicating motion one to the other, said linked expansion-gearing connecting with said last-named upper feed-roll from in front of the feeding-in side thereof, and driving the same downwardly, with said last-mentioned roll located in vertical plane between the vertical planes of the pivots from which said respective gears swing, said housing and linked expansion-gearing having their only common articulation at the swinging end of said housing.

18. In feeding mechanism for woodworking machinery, the combination of a main frame, a lower feed-roll, a self-contained upper feed-roll and pressure device supporting supplemental frame, said supplement frame being a rigid structure, said supplemental frame and pressure device extending substantially below said lower feed-roll, said supplemental frame and main frame having long guideways between them, a swinging upper feed-roll housing having its pivot at its rear on said supplemental frame, an upper feed-roll in its swinging end, link expansion-gearing projected from in front of and toward the front or feed-in side of said last-named feed-roll and connecting with the swinging end of said housing and having a pivot on said main frame from which it swings, said upper feed-roll located in vertical plane between said pivots, substantially as described.

19. In a feeding device for woodworking machinery, the combination of a main frame, a lower feed-roll therein, a supplemental frame being a rigid structure extending below said lower roll adjustable on the main frame, an upper feed-roll housing pivoted at its rear to said supplemental frame at substantially the transverse middle of the sides of the latter, an upper yielding feed-roll in its swinging end, link expansion-gearing connecting the swinging end of said housing to the main frame and extending from in front toward the feed-in side of said upper feed-roll and driving said feed-in side downwardly, the pivot for said housing being in rear of said upper feed-roll, substantially as described.

20. In a feeding device for woodworking machinery, the combination with the main frame, of a feed-roll yielding to inequalities in the stock passing through the machine, a journaled gear therefor, a yieldable support in which said gear is journaled, and a shaft movable longitudinally in said gear for permitting removal of said feed-roll.

21. In a feeding device for woodworking machinery, the combination with the main frame, of a feed-roll yielding to inequalities in the stock passing through the machine, a journaled gear therefor, a feed-roll shaft, a yieldable support in which said gear is journaled, link expansion-gearing connecting said support with the main frame and having a link pivoted about said journaled gear, said feed-roll shaft being longitudinally movable in said journaled gear for permitting removal of said feed-roll without dismantling said link or journaled gear.

22. In a feeding device for woodworking machinery, the combination of a gear, a bearing therefor, said gear having a bore, a feed-roll, a feed-roll shaft, said gear, bearing, feed-roll and feed-roll shaft yielding to inequalities in stock passing through the machine, and link expansion-gearing meshing with said first-named gear and pivoted about said shaft, said feed-roll shaft being longitudinally movable in said bore for permitting removal of said roll without dismantling said gearing, substantially as described.

23. In a feeding device for woodworking machinery, the combination of an upper feed-roll support, a gear journaled therein, said gear having a bore, a yielding feed-roll, a feed-roll shaft, link expansion-gearing meshing with said bored gear and having a link pivoted on said support and swinging about said shaft, said shaft being longitudinally movable in said bored gear and pivoted link for permitting removal of said roll.

24. In a molding-machine, the combination of interchangeable yieldable feed-rolls, gearing therefor and yielding therewith, a bearing in which said gearing is journaled yielding with said gearing, a feed-roll shaft movable longitudinally in said gearing for permitting radial interchanging of the feed-rolls, substantially as described.

25. In a molding-machine, the combination of a yieldable feed-roll housing, feed-roll gearing journaled on the housing and yielding with the housing, link expansion-gearing driving the same from the main frame, and a feed-roll shaft, said link expansion-gearing having a link pivoted about said feed-roll shaft and said feed-roll shaft movable longitudinally in said journaled feed-roll gearing for permitting removal of the feed-roll without dismantling said feed-roll gearing or link expansion mechanism, substantially as described.

26. In a feeding device for woodworking machinery, the combination of driving means for a feed-roll comprising a gear having a journal-hub, a bearing for said hub, link expansion-gear mechanism pivoted on said bearing, said hub having a bore and a shaft taking through and rotatively secured in said hub and the feed-roll and arranged for permitting longitudinal movement of the shaft in said gearing and feed-roll for permitting removal of the feed-roll, substantially as described.

27. In a feeding device for woodworking machinery, the combination of a pair of yielding bearings, yielding gears journaled therein, a yielding feed-roll, a bore for each of the gears and the feed-roll, a yielding feed-roll shaft movable longitudinally in said bores for permitting removal of said yielding feed-roll, and means for securing the yielding feed-roll, shaft and gears rotatively together, substantially as described.

28. In a feeding device for woodworking machinery, the combination of a pair of yielding gears having long hubs, yielding bearings therefor, said gears each having a bore, a yielding feed-roll having a bore, a shaft taking into said bores in the gears and feed-roll, means for securing said gears, shaft and feed-roll rotatively together and constructed for permitting longitudinal movement of the shaft for permitting removal of said roll while retaining said hubs of the gears in their bearings, substantially as described.

29. In a feeding device for woodworking machinery, the combination of a pivoted housing, a bearing in the housing, a feed-roll gear having a hub journaled in said bearing, said hub having a bore, a shaft slidable longitudinally in said bore for permitting removal of the feed-roll, a cap for said bearing having a ring extending about said hub, and link expansion-gearing pivoted about said ring, substantially as described.

30. In a feeding device for woodworking machinery, the combination of a feed-roll support, a bearing in said support, a yielding feed-roll, a gear having a hub journaled in said bearing, said hub having a bore, a shaft movable longitudinally in said bore for permitting removal of said feed-roll, a cap for the bearing, and link expansion-gearing pivoted on said cap.

31. In a feeding device for woodworking machinery, the combination of a main frame, gearing thereon, a supplemental frame adjustable on the main frame, a yielding feed-roll housing pivoted on the supplemental frame, feed-roll gearing having a hub journaled in the housing, a yielding feed-roll, a feed-roll shaft movable longitudinally in said feed-roll gearing for permitting radial removal of said feed-roll, and link expansion-gearing connecting said feed-roll gearing with the gearing on the main frame and having a link pivoted on said housing about said feed-roll shaft, substantially as described.

32. In a feeding device for woodworking machinery, the combination of a main frame, gearing thereon, a supplemental frame adjustable on the main frame, a feed-roll housing pivoted on the supplemental frame, a bearing thereon, a feed-roll gear having a hub journaled in said bearing, a cap for said bearing having a ring taking about said hub, link expansion-gearing pivoted about said ring and connecting with the gearing on the main frame, a feed-roll, a shaft movable longitudinally in said feed-roll gear-hub for permitting radial removal of said feed-roll while maintaining its driving-gearing in position, substantially as described.

33. In a machine of the character described, the combination of the main frame A, lower feeding-rolls F F', supplemental frame B having side standards 11 12 rigid thereon and extending inside the main frame above and substantially below said lower feeding-rolls and having sliding connection with said main frame extending substantially below said lower feeding-rolls, cross-shaft 35 at the upper end of the supplemental frame, swinging upper feed-roll housings C C' pivoted about said shaft and projecting respectively toward the feeding-in and toward the feeding-out end of said machine, an upper feed-roll in each housing, a shaft 52 for the frame, link expansion-gearing pivoted about said shaft and projected from in front of toward the feed-in side of the roll in housing C and connecting with the upper feed-roll in housing C for driving the same said housing C and said link expansion-gearing having a single common swinging articulating axis, which is located at the swinging end of said housing, the upper feed-roll in housing C being in vertical plane between said cross-shaft 35 and said shaft 52, and a pressure device for said housings, substantially as described.

34. In a machine of the character described, the combination of the main frame A, lower feeding-rolls F F', supplemental frame B having side standards 11 12 rigid thereon and extending inside the main frame above and substantially below said lower feeding-rolls and having sliding connection with said main frame extending substantially below said lower feeding-rolls, cross-shaft 35 at the upper end of the supplemental frame, swinging upper feed-roll housings C C' pivoted about said shaft and projecting respectively toward the feeding-in and toward the feeding-out end of said machine, an upper feed-roll in each housing, a shaft 52 for the frame, link expansion-gearing pivoted about said shaft and projected from in front of toward the feed-in side of the roll in housing C and connecting with the upper feed-roll in housing C for driving the same, said housing C and said link expansion-gearing having a single common swinging articulating axis which is located at the swinging end of said housing, the upper feed-roll in housing C being in vertical plane between said cross-shaft 35 and said shaft 52, a weight-lever 85 having pivot 87 to the lower end of one of said standards, said weight-lever also having connections 93 94 with said housings by means of links, said swinging housings and weight-lever and connections between the same mounted on and moving with said supplemental frame in the adjustment of the latter, substantially as described.

35. In a feeding device for woodworking machinery, the combination of a main frame, a slide thereon, means for adjusting said slide on said main frame, an upper feed-roll housing pivoted at its rear on said slide, an upper feed-roll mounted therein, link expansion-gearing projected toward said housing from in front thereof and connecting with said feed-roll for driving the forward feeding-face of said roll downward and thereby exerting downward pressure at the swinging end of said housing, and a weighting device connecting with said housing between the axle of said feed-roll and the pivot of said housing and movable with said slide, substantially as described.

36. In a feeding device for woodworking machinery, the combination of a slide, a housing pivoted at its rear on said slide, an upper feed-roll mounted therein, link expansion-gearing projected toward said housing from in front thereof and connecting with the feed-roll for driving the forward feeding-face of said roll downward and thereby exerting downward yielding pressure at the swinging end of said housing, and a pressure device acting with said link expansion-gearing on said housing for yieldingly forcing the swinging end of said housing downward, substantially as described.

In testimony whereof I have signed my name hereto in the presence of two subscribing witnesses.

JOHN R. THOMAS.

Witnesses:
JOHN F. KRENKEL,
ROY STEVENS.